US012156007B2

(12) United States Patent
Ren et al.

(10) Patent No.: US 12,156,007 B2
(45) Date of Patent: Nov. 26, 2024

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/914,362

(22) PCT Filed: Jul. 20, 2022

(86) PCT No.: PCT/CN2022/106730

§ 371 (c)(1),
(2) Date: Sep. 26, 2022

(87) PCT Pub. No.: WO2024/000687

PCT Pub. Date: Jan. 4, 2024

(65) Prior Publication Data

US 2024/0223953 A1 Jul. 4, 2024

(30) Foreign Application Priority Data

Jun. 30, 2022 (CN) ........................ 202221705862.0

(51) Int. Cl.
*H04R 7/04* (2006.01)
*H04R 11/02* (2006.01)

(52) U.S. Cl.
CPC ............... *H04R 7/04* (2013.01); *H04R 11/02* (2013.01)

(58) Field of Classification Search
CPC .................................. H04R 7/04; H04R 11/02
See application file for complete search history.

(56) References Cited

U.S. PATENT DOCUMENTS

2023/0403499 A1* 12/2023 Voishvillo .............. H04R 7/127
2024/0073585 A1* 2/2024 Ren .......................... H04R 1/24
2024/0073616 A1* 2/2024 Ren .......................... H04R 7/18
2024/0073618 A1* 2/2024 Ren .......................... H04R 1/24

* cited by examiner

*Primary Examiner* — Andrew Sniezek
(74) *Attorney, Agent, or Firm* — W&G Law Group

(57) ABSTRACT

A coaxial speaker includes a frame, a vibration system, and a magnetic circuit system. The vibration system includes a vibrating diaphragm and a voice coil. The magnetic circuit system includes a transmission cavity, an inner magnetic gap, and an outer magnetic gap. The transmission cavity penetrates through the magnetic circuit system. The vibrating diaphragm includes a first vibrating diaphragm, a second vibrating diaphragm, and a third vibrating diaphragm. The first vibrating diaphragm and the third vibrating diaphragm seal the transmission cavity. The coaxial speaker not only increases a range of frequency bands, improves conversion efficiency of high pitch sound, shortens a length of a front cavity from a vibration system to a sound outlet so as to reduce energy loss caused by front cavity resonance, but also ensures waterproofness of tweeter units, and achieves a private call function in an assembly application process for a complete machine.

9 Claims, 4 Drawing Sheets

COAXIAL SPEAKER

TECHNICAL FIELD

The present disclosure relates to a field of electroacoustic conversion, and in particular to a coaxial speaker.

BACKGROUND

Coaxial speaker refers to speakers each integrated with two speaker units, and the two speaker units are coaxially disposed. Sound sources of the two speaker units of each of the coaxial speakers are disposed on a front surface of each of the coaxial speakers. That is, sound production directions of the two speaker units are the same. The sound sources of the two speaker units of the coaxial speaker may further be disposed on the front surface and a back surface of each of the coaxial speakers. That is, the sound production directions of the two speaker units are different.

The two speaker units of the coaxial speaker in related art respectively includes a separated vibration system and a separated magnetic circuit system. Usually, one of the two speaker units is configured to emit high pitch sound, and the other one of the two speaker units is configured to emit bass sound. However, there are problems existed in the coaxial speakers, which are as following.

First, when the sound production directions of the two speaker units are the same, conversion efficiency of high pitch sound is insufficient.

Second, in the application, when the sound production directions of the two speaker units are different, a long front cavity needs to be designed from the vibration system to a sound outlet so as to be matched with sound emitted by vibration of the two vibration systems to be sent out through the sound outlet. However, resonance generated by the long front cavity leads to energy loss.

Therefore, it is necessary to provide a new coaxial speaker to solve above technical problems.

SUMMARY

The present disclosure aims to provide a coaxial speaker, and the coaxial speaker not only increases a range of frequency bands, improves conversion efficiency of high pitch sound, shortens a length of a front cavity from a vibration system to a sound outlet so as to reduce energy loss caused by front cavity resonance, but also ensures waterproofness of tweeter units, and achieves a private call function in an assembly application process for a complete machine.

The coaxial speaker of the present disclosure includes a frame, a vibration system, and a magnetic circuit system. The vibration system and the magnetic circuit system are fixed to the frame. The vibration system includes a vibrating diaphragm and a voice coil. The magnetic circuit system includes a transmission cavity, an inner magnetic gap, and an outer magnetic gap. The inner magnetic gap is defined around the transmission cavity. The outer magnetic gap is defined around the inner magnetic gap. The transmission cavity penetrates through the magnetic circuit system. The vibrating diaphragm includes a first vibrating diaphragm, a second vibrating diaphragm, and a third vibrating diaphragm. The second vibrating diaphragm is disposed around the first vibrating diaphragm. An outer periphery of the first vibrating diaphragm and an inner periphery of the second vibrating diaphragm are both fixed to the magnetic circuit system. The outer periphery of the second vibrating diaphragm is fixed to the frame. An outer periphery of the third vibrating diaphragm is fixed to one side, facing away from the first vibrating diaphragm, of the magnetic circuit system. The first vibrating diaphragm and the third vibrating diaphragm seal the transmission cavity. The voice coil includes a first voice coil and a second voice coil. The first voice coil is inserted into the inner magnetic gap and drives the third vibrating diaphragm to vibrate. The second voice coil is inserted into the outer magnetic gap and drives the second vibrating diaphragm to vibrate. The second vibrating diaphragm is configured to emit bass sound. High pitch sound emitted by the third vibrating diaphragm is transmitted through the transmission cavity and is emitted out by the first vibrating diaphragm.

Furthermore, the magnetic circuit system includes a magnetic yoke and a primary magnetic portion. The primary magnetic portion is surrounded by the outer magnetic gap. The primary magnetic portion includes a first magnet, a second magnet, and a primary pole core. The first magnet is fixedly disposed on the magnetic yoke. The second magnet is disposed on one side, facing the first vibrating diaphragm, of the first magnet. The outer periphery of the first vibrating diaphragm and the inner periphery of the second vibrating diaphragm are both fixed to the second magnet. The outer periphery of the third vibrating diaphragm is fixed to one side, facing away from the primary magnetic portion, of the magnetic yoke. A first through hole penetrates through the first magnet. A second through hole penetrates through the second magnet. The primary pole core includes a wall portion and a plate portion. The wall portion is inserted into the first through hole. The wall portion divides the first through hole into the inner magnetic gap and an enclosing cavity. The plate portion is connected to the wall portion. The plate portion is clamped between the first magnet and the second magnet. A third through hole penetrates through the magnetic yoke. The transmission cavity includes the second through hole, the third through hole, and the enclosing cavity.

Furthermore, the wall portion is of a continuous annular structure.

Furthermore, the magnetic circuit system further includes a secondary magnetic portion. The secondary magnetic portion is fixedly disposed between the magnetic yoke and the frame. The secondary magnetic portion and the primary magnetic portion are spaced to form the outer magnetic gap.

Furthermore, the secondary magnetic portion includes a third magnet and a secondary pole core. The third magnet is fixedly disposed on the magnetic yoke. The secondary pole core is fixedly disposed between the third magnet and the frame.

Furthermore, the first magnet, the second magnet, and the third magnet are all magnetized along a vibration direction of the vibrating diaphragm. The first magnet and the second magnet are oppositely disposed at a same magnetic pole. Magnetizing directions of the first magnet and the third magnet are opposite.

Furthermore, the second vibrating diaphragm includes an inner diaphragm body, an outer diaphragm body, and a framework. The outer diaphragm body is disposed around the inner diaphragm body. The framework includes a flat plate portion and a first connecting portion. The flat plate portion is connected to the inner diaphragm body and the outer diaphragm body. The first connecting portion extends from the flat plate portion to the outer magnetic gap. The first connecting portion is connected to the second voice coil.

Furthermore, the framework further includes a second connecting portion. The second connecting portion extends from the flat plate portion. The second connecting portion is spaced apart from the first connecting portion. The vibration system further includes elastic supporting components. A first end of each of the elastic supporting components is connected to the second connecting portion. A second end of each of the elastic supporting components is connected to the frame.

Furthermore, fixing frames are fixedly disposed on two opposite sides of the magnetic circuit system. The outer periphery of the first vibrating diaphragm and the outer periphery of the third vibrating diaphragm are fixed to inner walls of the fixing frames.

Furthermore, the third vibrating diaphragm includes a third diaphragm body and a third dome. An outer periphery of the third diaphragm body is fixed to the inner walls of the fixing frames. An inner periphery of the third diaphragm body is fixed to the third dome.

Compared with related art, the present disclosure provides the coaxial speaker, the second vibrating diaphragm and the third vibrating diaphragm of which are respectively disposed on two opposite sides of the magnetic circuit system to respectively provide the bass sound and the high pitch sound, so as to increase the range of the frequency bands of the coaxial speaker and improve the conversion efficiency of the high pitch sound. Meanwhile, the transmission cavity is sealed by the first vibrating diaphragm and the third vibrating diaphragm, so that vibration energy generated by the third vibrating diaphragm under a driving action of the first voice coil is transmitted to the first vibrating diaphragm through the transmission cavity, and enables the first vibrating diaphragm to vibrate to emit the high pitch sound. The coaxial speaker not only emits the high pitch sound and the bass sound on a same side, but also shortens the length of the front cavity from the vibration system to the sound outlet, which reduces the energy loss caused by the front cavity resonance, and the first vibrating diaphragm and the third vibrating diaphragm further ensure the waterproofness of the tweeter units. What's more, vibration units where the third vibrating diaphragm belonging to are further receiver applications, and in the assembly application process for the complete machine, sound waves on a front surface and a back surface of the coaxial speaker are counteracted in a far field through defining holes on a back surface of a machine housing, and a normal call function is provided for sound waves on a front surface of a near field, which finally achieves the private call function.

DETAILED DESCRIPTION OF EMBODIMENT

Figure 1:
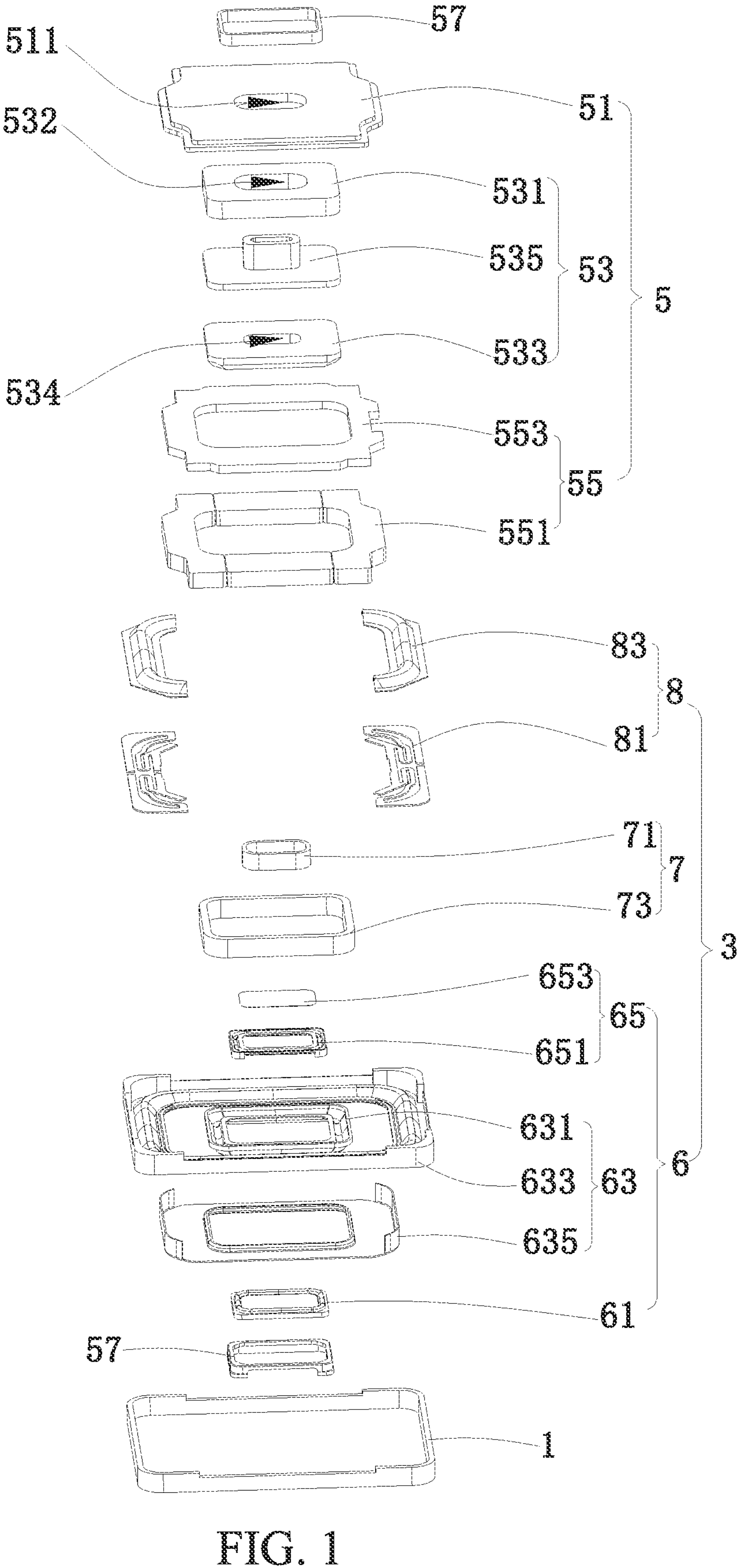
FIG. 1 is an exploded schematic diagram of a coaxial speaker according to one embodiment of the present disclosure.
Figure 2:
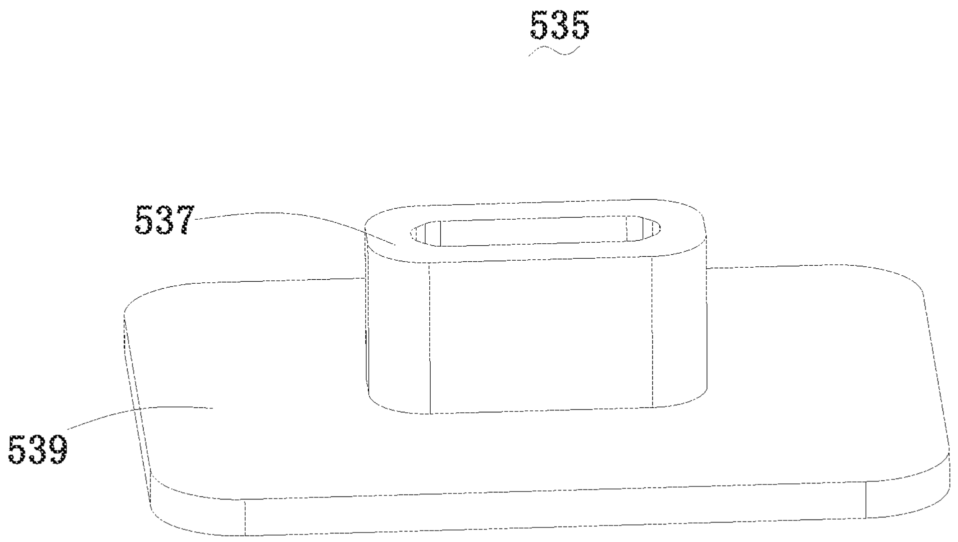
FIG. 2 is a structural schematic diagram of a primary pole core in the coaxial speaker shown in FIG. 1.

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-5, a coaxial speaker includes a frame 1, a vibration system 3, and a magnetic circuit system 5. The vibration system 3 and the magnetic circuit system 5 are fixed to the frame 1.

The vibration system 3 includes a vibrating diaphragm 6 and a voice coil 7. The voice coil 7 drives the vibrating diaphragm 6 to vibrate and produce sound.

The vibrating diaphragm 6 includes a first vibrating diaphragm 61, a second vibrating diaphragm 63, and a third vibrating diaphragm 65. The second vibrating diaphragm 63 is disposed around the first vibrating diaphragm 61. An outer periphery of the first vibrating diaphragm 61 and an inner periphery of the second vibrating diaphragm 63 are both fixed to the magnetic circuit system 5. The outer periphery of the second vibrating diaphragm 63 is fixed to the frame 1. An outer periphery of the third vibrating diaphragm 65 is fixed to one side, facing away from the first vibrating diaphragm 61, of the magnetic circuit system 5.

The voice coil 7 includes a first voice coil 71 and a second voice coil 73. The first voice coil 71 drives the third vibrating diaphragm 65 to vibrate. The second voice coil 73 drives the second vibrating diaphragm 63 to vibrate.

The first vibrating diaphragm 61, the second vibrating diaphragm 63, the third vibrating diaphragm 65, the first voice coil 71, and the second voice coil 73 are coaxially disposed. In this way, vibration units of the vibration system 3 are coaxially disposed.

It should be noted that, under a driving action of the first voice coil 71, vibration generated by the third vibrating diaphragm 65 emits high pitch sound. Under a driving action of the second voice coil 73, vibration generated by the second vibrating diaphragm 63 emits bass sound, that is, the second vibrating diaphragm 63 is configured to emit bass sound, which increases a range of frequency bands of the coaxial speaker. Meanwhile, due to a fact that the second vibrating diaphragm 63 and the third vibrating diaphragm 65 are respectively disposed on two opposite sides of the magnetic circuit system 5, which improves conversion efficiency of the high pitch sound.

The magnetic circuit system 5 includes a transmission cavity 5A, an inner magnetic gap 5B, and an outer magnetic gap 5C. The inner magnetic gap 5B is defined around the transmission cavity 5A. The outer magnetic gap 5C is defined around the inner magnetic gap 5B. The transmission cavity 5A penetrates through the magnetic circuit system 5. The first voice coil 71 is inserted into the inner magnetic gap 5B. The second voice coil 73 is inserted into the outer magnetic gap 5C. The first vibrating diaphragm 61 and the third vibrating diaphragm 65 seal the transmission cavity 5A. Due to a fact that the transmission cavity 5A is sealed by the first vibrating diaphragm 61 and the third vibrating diaphragm 65, vibration energy generated by the third vibrating diaphragm 65 under the driving action of the first voice coil 71 is transmitted to the first vibrating diaphragm 61 through the transmission cavity 5A, and enables the first vibrating diaphragm to vibrate to emit the high pitch sound. That is, when the third vibrating diaphragm 65 vibrates, the first vibrating diaphragm 61 is forced to vibrate. That is, the high pitch sound emitted by the third vibrating diaphragm 65 is transmitted through the transmission cavity 5A and is emitted out by the first vibrating diaphragm 61. Therefore, the coaxial speaker not only emits the high pitch sound and the bass sound on a same side, but also shortens a length of the front cavity from the vibration system to the sound outlet, which reduces the energy loss caused by the front cavity resonance. Further, the first vibrating diaphragm 61 and the third vibrating diaphragm 65 ensure waterproofness of the tweeter units. What's more, the vibration units where the third vibrating diaphragm 65 belonging to are further receiver applications, and in an assembly application process for a complete machine, sound waves on a front surface and a back surface of the coaxial speaker are counteracted in a far field through defining holes on a back surface of a machine housing, and a normal call function is provided for sound waves on a front surface of a near field, which finally achieves the private call function. The front surface of the near field is on one side where the first vibrating diaphragm 61 is located.

Specifically, the magnetic circuit system 5 includes a magnetic yoke 51, a primary magnetic portion 53, and a secondary magnetic portion 55. The primary magnetic portion 53 is surrounded by the outer magnetic gap 5C. The secondary magnetic portion 55 is fixedly disposed between the magnetic yoke 51 and the frame 1. The secondary magnetic portion 55 and the primary magnetic portion 53 are spaced to form the outer magnetic gap 5C.

A third through hole 511 penetrates through the magnetic yoke 51.

The primary magnetic portion 53 includes a first magnet 531, a second magnet 533, and a primary pole core 535. The first magnet 531 is fixedly disposed on the magnetic yoke 51. The second magnet 533 is disposed on one side, facing the first vibrating diaphragm 61, of the first magnet 531. The outer periphery of the first vibrating diaphragm 61 and the inner periphery of the second vibrating diaphragm 63 are both fixed to the second magnet 533. The outer periphery of the third vibrating diaphragm 65 is fixed to one side, facing away from the primary magnetic portion 53, of the magnetic yoke 51.

A first through hole 532 penetrates through the first magnet 531. That is, the first magnet 531 is of a continuous annular structure.

A second through hole 534 penetrates through the second magnet 533. That is, the second magnet 533 is of a continuous annular structure.

The primary pole core 535 includes a wall portion 537 and a plate portion 539. The wall portion 537 is inserted into the first through hole 532. The wall portion 537 divides the first through hole 532 into the inner magnetic gap 5B and an enclosing cavity 5D. The plate portion 539 is connected to the wall portion 537. The plate portion 539 is clamped between the first magnet 531 and the second magnet 533. The transmission cavity 5A includes the second through hole 534, the third through hole 511, and the enclosing cavity 5D.

In the present embodiment, the wall portion 537 is of a continuous annular structure. That is, the inner magnetic gap 5B and the enclosing cavity 5D are separated by the wall portion 537. The transmission cavity 5A includes the second through hole 534, the third through hole 511, and the enclosing cavity 5D, and does not include the inner magnetic gap 5B. It should be understood that, in other embodiments, the wall portion 537 is further composed of a plurality of split structures disposed at intervals. That is, the inner magnetic gap 5B and the enclosing cavity 5D are communicated through gaps between split bodies of the wall portion 537. The transmission cavity 5A includes the second through hole 534, the third through hole 511, the enclosing cavity 5D, and further includes the inner magnetic gap 5B.

The secondary magnetic portion 55 includes a third magnet 551 and a secondary pole core 553. The third magnet 551 is fixedly disposed on the magnetic yoke 51. The secondary pole core 553 is fixedly disposed between the third magnet 551 and the frame 1. That is, the magnetic circuit system 5 is fixed to the frame 1 through the secondary pole core 553 and the frame 1.

The first magnet 531, the second magnet 533, and the third magnet 551 are all magnetized along a vibration direction of the vibrating diaphragm 6. The first magnet 531 and the second magnet 533 are oppositely disposed at a same magnetic pole. Magnetizing directions of the first magnet 531 and the third magnet 551 are opposite.

It should be noted that the first magnet 531, the second magnet 533, and the third magnet 551 are artificial magnetic steels, or are formed by processing natural magnets. The primary pole core 535 and the secondary pole core 553 are both made of magnetic conductive materials.

It should be noted that the magnetic circuit system 5 is not limited to the above structure. For example, in other embodiments, the secondary magnetic portion 55 is not provided. Correspondingly, the magnetic circuit system 5 is fixed to the frame 1 by fixing the magnetic yoke 51 to the frame 1. Alternatively, the outer magnetic gap is further formed by the magnetic yoke and a primary magnet at intervals. Specifically, the magnetic yoke includes a bottom wall and a side wall. The bottom wall is fixedly disposed on the first magnet 531. The side wall extends from the bottom wall and is spaced from the primary magnet to form the outer magnetic gap.

Figure 3:
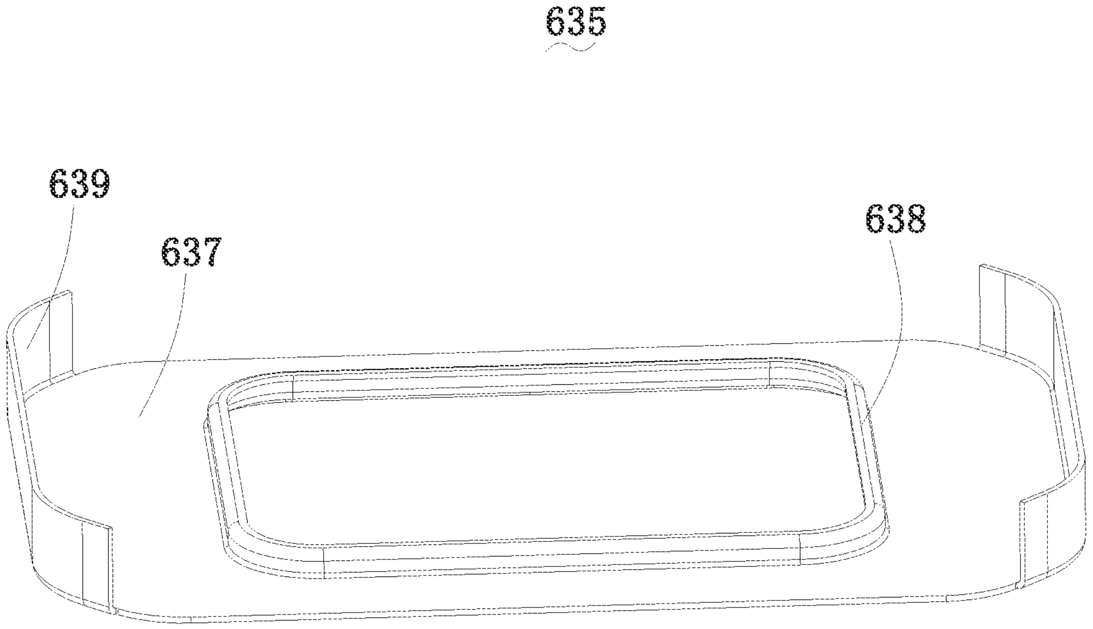
FIG. 3 is a structural schematic diagram of a framework in the coaxial speaker shown in FIG. 1.
Figure 4:
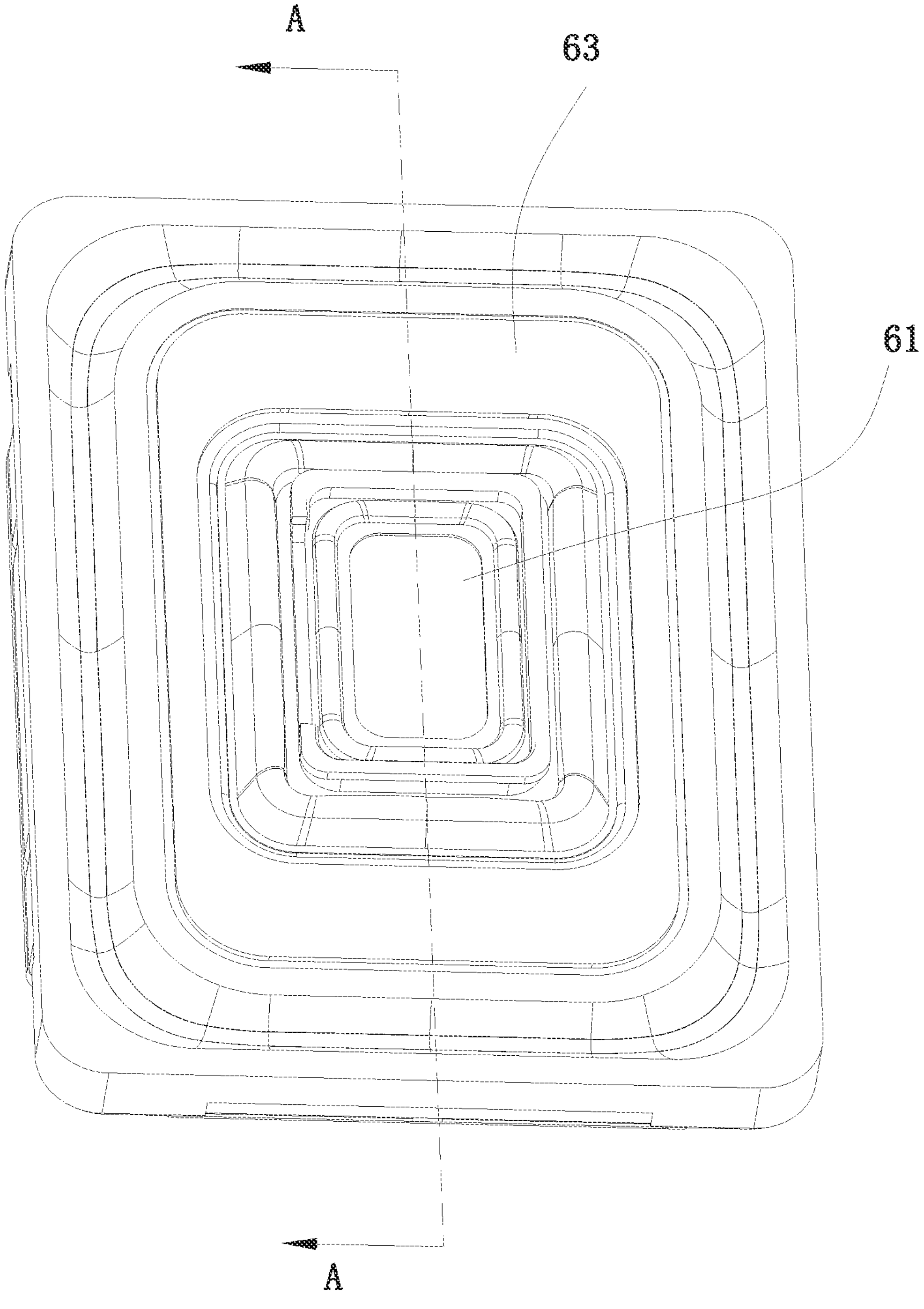
FIG. 4 is a structural schematic diagram of the coaxial speaker shown in FIG. 1 after assembling.
Figure 5:
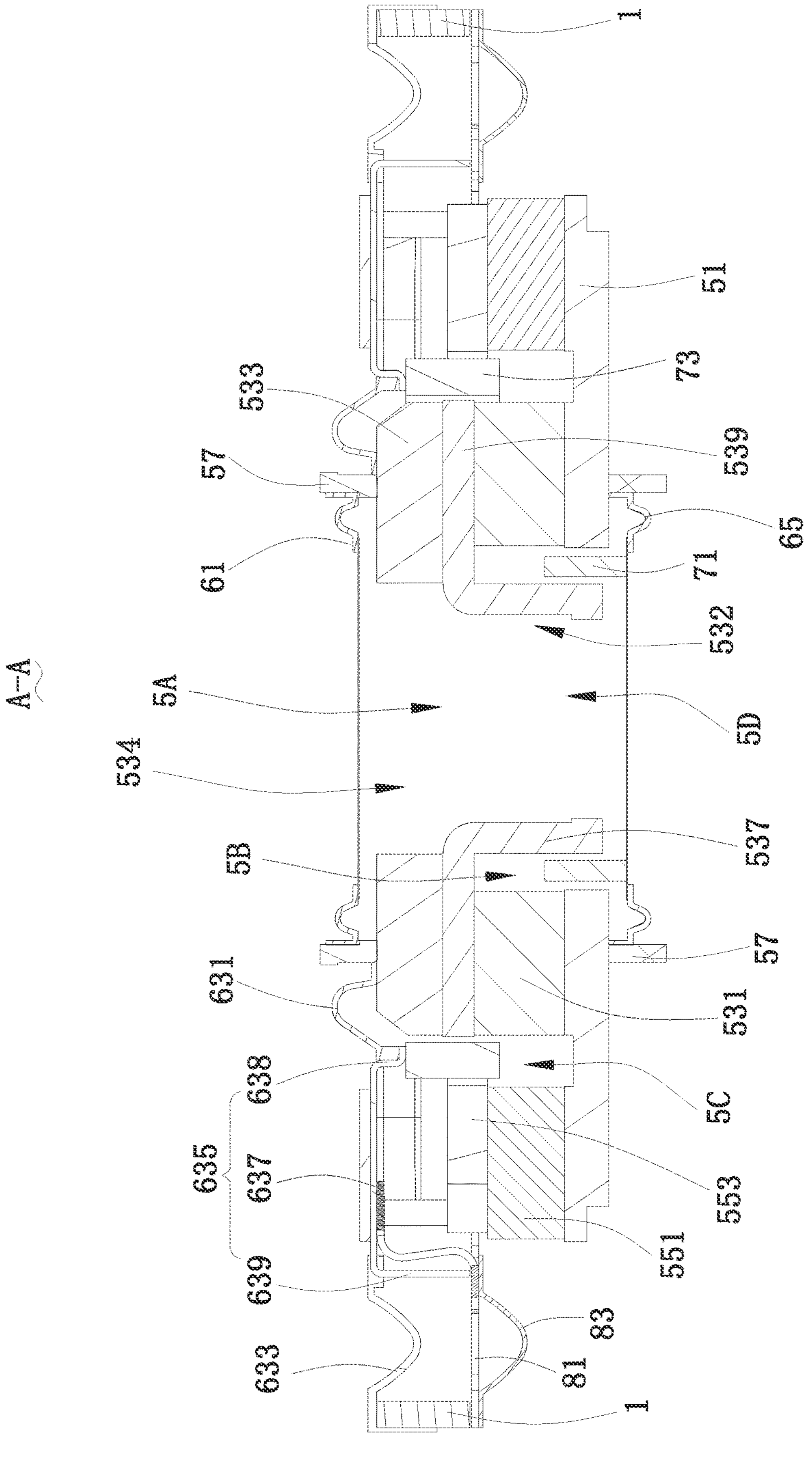
FIG. 5 is a cross-sectional schematic diagram of the coaxial speaker taken along the line A-A shown in FIG. 4.

As shown in FIG. 3 and FIG. 5, the second vibrating diaphragm 63 includes an inner diaphragm body 631, an outer diaphragm body 633, and a framework 635. The outer diaphragm body 633 is disposed around the inner diaphragm body 631. The framework 635 includes a flat plate portion 637 and a first connecting portion 638. The flat plate portion 637 is connected to the inner diaphragm body 631 and the outer diaphragm body 633. The first connecting portion 638 extends from the flat plate portion 637 to the outer magnetic gap 5C. The first connecting portion 638 is connected to the second voice coil 73. An inner periphery of the inner diaphragm body 631 is fixed to the second magnet 533. An outer periphery of the outer diaphragm body 633 is fixed to the frame 1.

As shown in FIG. 3 and FIG. 5, the framework 635 further includes a second connecting portion 639. The second connecting portion 639 extends from the flat plate portion 637. The second connecting portion 639 is spaced apart from the first connecting portion 638. The vibration system 3 further includes elastic supporting components 8. A first end of each of the elastic supporting components 8 is connected to the second connecting portion 639. A second end of each of the elastic supporting components 8 is connected to the frame 1.

In the embodiment, there are two elastic supporting components 8. The two elastic supporting components 8 are disposed at intervals along long axis direction of the coaxial speaker. In this way, the second voice coil 73 is prevented from swinging in the long axis direction through the elastic supporting components 8, which improves sound production quality.

Each of the elastic supporting components 8 includes a flexible circuit board 81 and a secondary vibrating diaphragm 83. The flexible circuit board 81 is fixedly disposed on one side, distal from the second vibrating diaphragm 63, of the frame 1. The flexible circuit board 81 is electrically connected to the second voice coil 73. The secondary vibrating diaphragm 83 is fixedly disposed on one side, distal from the second vibrating diaphragm 63, of the flexible circuit board 81.

In the embodiment, fixing frames 57 are fixedly disposed on two opposite sides of the magnetic circuit system 5. The outer periphery of the first vibrating diaphragm 61 and the outer periphery of the third vibrating diaphragm 65 are fixed to inner walls of the fixing frames 57. Specifically, one of the fixing frames 57 is fixed to one side, facing away from the first magnet 531, of the second magnet 533. One of the fixing frames 57 is further fixed to one side, facing away from the first magnet 531, of the magnetic yoke 51. That is, the first vibrating diaphragm 61 and the third vibrating diaphragm 65 are respectively and indirectly fixed to the magnetic circuit system 5 through the fixing frames 57. In this way, two opposite sides of the first vibrating diaphragm 61 and the third vibrating diaphragm 65 both have enough vibration space to avoid structures of avoiding vibration of the first vibrating diaphragm 61 and the third vibrating diaphragm 65 on the second magnet 533 and the magnetic yoke 51, thereby facilitating increase of a volume of the second magnet 533 and magnetism of the magnetic yoke 51, so as to increase strength of a magnetic field in the inner magnetic gap 5B and the outer magnetic gap 5C.

It should be noted that since the two opposite sides of the first vibrating diaphragm 61 and the third vibrating diaphragm 65 both have enough vibration space. That is, a certain gap is formed between the first vibrating diaphragm 61 and the magnetic circuit system, and a certain gap is formed between the third vibrating diaphragm 65 and the magnetic circuit system. Therefore, in the embodiment, the transmission cavity 5A further includes a space between the first vibrating diaphragm 61 and the magnetic circuit system 5 and a space between the third vibrating diaphragm 65 and the magnetic circuit system 5.

In the present embodiment, the first vibrating diaphragm 61 and the third vibrating diaphragm 65 have the same structure. Taking the third vibrating diaphragm 65 as an example, the third vibrating diaphragm 65 includes a third diaphragm body 651 and a third dome 653. An outer periphery of the third diaphragm body 651 is fixed to the inner walls of the fixing frames 57. An inner periphery of the third diaphragm body 651 is fixed to the third dome 653.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A coaxial speaker, comprising:

a frame;

a vibration system; and a magnetic circuit system;

wherein the vibration system and the magnetic circuit system are fixed to the frame; the vibration system comprises a vibrating diaphragm and a voice coil, the magnetic circuit system comprises a transmission cavity, an inner magnetic gap, and an outer magnetic gap, the inner magnetic gap is defined around the transmission cavity, the outer magnetic gap is defined around the inner magnetic gap, the transmission cavity penetrates through the magnetic circuit system; the vibrating diaphragm comprises a first vibrating diaphragm, a second vibrating diaphragm, and a third vibrating diaphragm; the second vibrating diaphragm is disposed around the first vibrating diaphragm, an outer periphery of the first vibrating diaphragm and an inner periphery of the second vibrating diaphragm are both fixed to the magnetic circuit system, an outer periphery of the second vibrating diaphragm is fixed to the frame, an outer periphery of the third vibrating diaphragm is fixed to one side, facing away from the first vibrating diaphragm, of the magnetic circuit system; the first vibrating diaphragm and the third vibrating diaphragm seal the transmission cavity; the voice coil comprises a first voice coil and a second voice coil, the first voice coil is inserted into the inner magnetic gap and drives the third vibrating diaphragm to vibrate, the second voice coil is inserted into the outer magnetic gap and drives the second vibrating diaphragm to vibrate; the second vibrating diaphragm is configured to emit bass sound, and high pitch sound emitted by the third vibrating diaphragm is transmitted through the transmission cavity and is emitted out by the first vibrating diaphragm;

the second vibrating diaphragm comprises an inner diaphragm body, an outer diaphragm body, and a framework; the outer diaphragm body is disposed around the inner diaphragm body, the framework comprises a flat plate portion and a first connecting portion, the flat plate portion is connected to the inner diaphragm body and the outer diaphragm body, the first connecting portion extends from the flat plate portion to the outer magnetic gap, and the first connecting portion is connected to the second voice coil.

2. The coaxial speaker according to claim 1, wherein the magnetic circuit system comprises a magnetic yoke and a primary magnetic portion, the primary magnetic portion is surrounded by the outer magnetic gap; the primary magnetic portion comprises a first magnet, a second magnet, and a primary pole core; the first magnet is fixedly disposed on the magnetic yoke, the second magnet is disposed on one side, facing the first vibrating diaphragm, of the first magnet; the outer periphery of the first vibrating diaphragm and the inner periphery of the second vibrating diaphragm are both fixed to the second magnet; the outer periphery of the third vibrating diaphragm is fixed to one side, facing away from the primary magnetic portion, of the magnetic yoke; a first through hole penetrates through the first magnet, and a second through hole penetrates through the second magnet; the primary pole core comprises a wall portion and a plate portion, the wall portion is inserted into the first through hole, the wall portion divides the first through hole into the inner magnetic gap and an enclosing cavity, the plate portion is connected to the wall portion, the plate portion is clamped between the first magnet and the second magnet; a third through hole penetrates through the magnetic yoke, and the transmission cavity comprises the second through hole, the third through hole, and the enclosing cavity.

3. The coaxial speaker according to claim 2, wherein the wall portion is of a continuous annular structure.

4. The coaxial speaker according to claim 2, wherein the magnetic circuit system further comprises a secondary magnetic portion, the secondary magnetic portion is fixedly disposed between the magnetic yoke and the frame, and the secondary magnetic portion and the primary magnetic portion are spaced to form the outer magnetic gap.

5. The coaxial speaker according to claim 4, wherein the secondary magnetic portion comprises a third magnet and a secondary pole core, the third magnet is fixedly disposed on the magnetic yoke, and the secondary pole core is fixedly disposed between the third magnet and the frame.

6. The coaxial speaker according to claim 5, wherein the first magnet, the second magnet, and the third magnet are all magnetized along a vibration direction of the vibrating diaphragm, the first magnet and the second magnet are oppositely disposed at a same magnetic pole, and magnetizing directions of the first magnet and the third magnet are opposite.

7. The coaxial speaker according to claim 1, wherein the framework further comprises a second connecting portion, the second connecting portion extends from the flat plate portion, and the second connecting portion is spaced apart from the first connecting portion; the vibration system further comprises elastic supporting components, a first end of each of the elastic supporting components is connected to the second connecting portion, and a second end of each of the elastic supporting components is connected to the frame.

8. The coaxial speaker according to claim 1, wherein fixing frames are fixedly disposed on two opposite sides of the magnetic circuit system, the outer periphery of the first vibrating diaphragm and the outer periphery of the third vibrating diaphragm are fixed to inner walls of the fixing frames.

9. The coaxial speaker according to claim 8, wherein the third vibrating diaphragm comprises a third diaphragm body and a third dome, an outer periphery of the third diaphragm body is fixed to the inner walls of the fixing frames, and an inner periphery of the third diaphragm body is fixed to the third dome.

* * * * *